Patented Dec. 24, 1929

1,740,731

UNITED STATES PATENT OFFICE

JAMES H. GRAVELL, OF ELKINS PARK, PENNSYLVANIA

METHOD OF PREPARING METAL FOR PAINTING

No Drawing. Application filed February 12, 1929. Serial No. 339,500.

This invention relates to preparing metal for painting and has to do with that class of cleaners which are applied in a moist or liquid state and are permitted to dry on the material to be cleaned, before being removed.

The objects of this invention are to extend the use of such processes to preparing metal, which is rusty or oily or both, for painting; to provide a process for such metal that does not require the use of water for removing acid cleaning material; to provide a process which may be used with good effect on the metals in general use and to generally improve the art of preparing metals for painting.

Although the process may be used to advantage on a variety of metals, such as lead, copper, nickel, aluminum, tin, etc., it is particularly useful for preparing steel for painting, and therefore readily adapts itself to preparing sheet steel automobile bodies for painting.

Generally stated, the process consists in applying a solution of a metal etching acid to the metal to be cleaned and permitting it to act on the metal to remove any rust that may happen to be present, assisting the action with abrasion or rubbing, if necessary, and before the acid has dried on the metal applying to the surface a finely divided material adapted to absorb the solution of acid and the deleterious products of its reaction, permitting the absorbent to dry on the metal, and then removing the absorbent together with the spent solution of acid and the deleterious products of its reaction.

Although most any metal etching acid may be used for the purpose, I prefer to use phosphoric acid, as this acid has less tendency to cause the metal to subsequently rust. In case the surface to be cleaned is not oily, it will be found satisfactory to use an aqueous solution of the acid, but in cases where there is oil present on the metal, it will be found necessary to use an oil solvent, either alone or in connection with water, to make the acid solution. Such solvents as ethyl alcohol, methyl alcohol, butyl alcohol, acetone, and ethyl-methyl-ketone may be used; in fact, any solvent, which enables the solution to penetrate the film of oil and attack the metal, may be used with more or less success. The addition of benzol, or a like material, will give to the solution the additional property of removing paint, which is of advantage in preparing steel automobile bodies for painting. The following formula has been found satisfactory:

|  | Gallons |
|---|---|
| Ortho-phosphoric acid (75%) | 20 |
| Denatured alcohol (ethyl) | 25 |
| Butyl alcohol | 25 |
| Benzol | 30 |

This material may be locally applied, as with a brush, to the rusty portions of the metal and to those parts spotted with paint, or the entire surface may be covered, and its action may be assisted with an abrasive or rubbing where it is deemed necessary.

The absorbent material employed to dry up the acid solution may be any material not affected by the acid and having suitable absorbent properties. I have found such materials as raw starch, clay and various clay pigments, such as American raw umber, are usable.

These are usually obtained in a finely powdered state or can be finely powdered and are, therefore, easily dusted or otherwise applied to the surface to be cleaned. One of the best ways to apply the absorbent material is to make it an ingredient in a paint-like material by admixing it with water, or better still, with an oil solvent of alcohol-like properties. I have found a formula constructed on the following plan effective:

| | |
|---|---|
| Denatured alcohol (ethyl) | 30 gallons |
| Butyl alcohol | 15 gallons |
| Clay (unburnt) | 250 pounds |
| Water | 35 gallons |

This is thin enough to be applied to the metal by spraying, and, after it has dried, it may be removed by brushing or with an abrasive or by rubbing it off or away.

To commercially carry out my process, say on a steel automobile body, I proceed as follows:

When the body is made ready for the painting operation I apply the described solution of etching acid to the rusty portions of the metal and to any portions of the metal which may have been accidentally smeared with paint. In case the rust is relatively heavy or the paint is relatively hard, I assist the action of the solution containing metal etching acid by rubbing with an abrasive, such as steel wool or emery cloth. After I have permitted the acid solution to remove the rust or paint, and before it has had sufficient time to dry on the metal, I spray the metal locally where I have applied the solution of acid, or I may spray the entire body, with the described absorbent material. I apply a substantial coating using about a third of a gallon to every 100 square feet of body surface. I then permit the absorbent material to dry on the metal.

During the drying period the absorbent material absorbs the spent solution of acid, together with the deleterious products of its reaction. I then remove the dried absorbent material, together with the materials it has absorbed, by brushing the surface or by rubbing it with an abrasive. The time of drying may be materially shortened if the metal is placed in an oven heated to a temperature of 212° F. more or less, in which case it may be accomplished in about fifteen minutes, if the oven is properly vented. After the absorbent material is removed the metal is ready to receive the coating of paint, which may be ordinary paint or lacquer, japan or varnish.

It will be observed that according to my process it is not necessary to remove the cleaning material by washing the metal with water, and thus my process is suitable where water is not readily obtainable or where the slop from water is objectionable.

I claim:

1. The method of preparing metal for painting comprising applying a solution of metal etching acid to the metal so that the acid acts on the metal, before the acid solution has dried on the metal applying to the metal a finely divided absorbent material and keeping the absorbent material on the metal until it is dry, and finally removing the absorbent material together with the deleterious products of the acid reaction.

2. The method of preparing metal for painting comprising applying a solution of phosphoric acid to the metal so that the acid acts on the metal, before the acid solution has dried on the metal applying to the metal a finely divided absorbent material adapted to absorb the acid solution and the deleterious products of its reaction and keeping the absorbent material on the metal until it is dry, and removing the absorbent material together with the deleterious products of the acid reaction.

3. The method of preparing metal for painting comprising applying a liquid admixture of alcohol and phosphoric acid to the metal so that the acid acts on the metal, before the admixture has dried on the metal applying to the metal a finely divided absorbent material adapted to absorb the admixture and the deleterious products of its reaction and keeping the absorbent solution on the metal until it is dry, and removing the absorbent material together with the deleterious products of the acid reaction.

4. The method of preparing metal for painting comprising applying a solution of metal etching acid to the metal so that the acid acts on the metal, before the acid solution has dried on the metal applying to the metal finely divided clay to absorb the said solution and the deleterious products of its reaction and keeping the clay on the metal until it is dry, and removing the clay together with the deleterious products of the acid reaction.

5. The method of preparing metal for painting comprising applying a solution of metal etching acid to the metal so that the acid acts on the metal, before the acid has dried on the metal applying to the metal a liquid containing a finely divided absorbent material adapted to absorb the said acid solution and the deleterious products of its reaction and keeping the absorbent material on the metal until it is dry, and removing the absorbent material together with the deleterious products of the acid reaction.

6. The method of preparing metal for painting comprising applying a solution of metal etching acid to the metal so that the acid acts on the metal, before the acid has dried on the metal applying to the metal a liquid admixture comprising alcohol and water and clay to absorb the acid solution and the deleterious products of its reaction and keeping the clay on the metal until it is dry, and removing the clay together with the deleterious products of the acid reaction.

7. The method of preparing steel for painting comprising applying an admixture of alcohol and phosphoric acid to the metal so that the acid acts on the metal, before said acid has dried on the metal applying a liquid admixture comprising alcohol and water and clay to absorb said acid and the deleterious products of its reaction and keeping the said clay on the metal until it is dry, and removing the clay together with the deleterious products of the acid reaction.

8. The method of preparing steel for painting which comprises etching the surface of the steel with a solution of a metal etching acid, drying the wet etched surface by applying to the etched surface while wet an absorbent material, drying the absorbent material and absorbed products of the acid reaction while on said surface, and finally removing from said surface the dry absorbent material along with any dry products of the acid reaction taken up by the absorbent material.

JAMES H. GRAVELL.